June 27, 1939.　　　R. A. ERREN　　　2,164,234
METHOD OF CHARGING INTERNAL COMBUSTION ENGINES
Filed Sept. 17, 1938
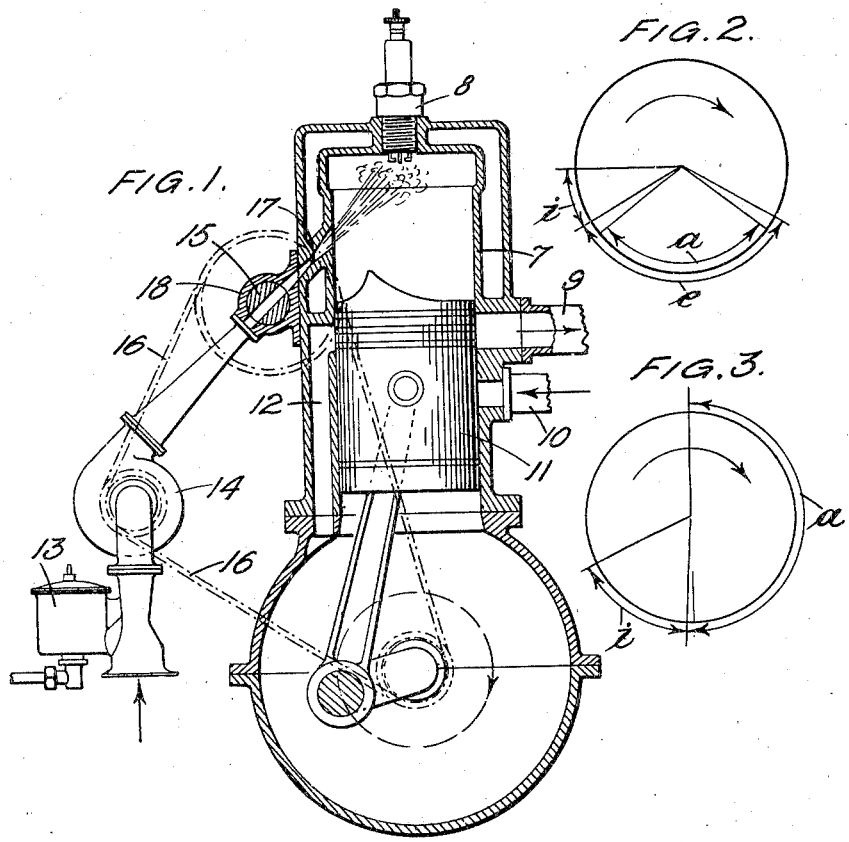
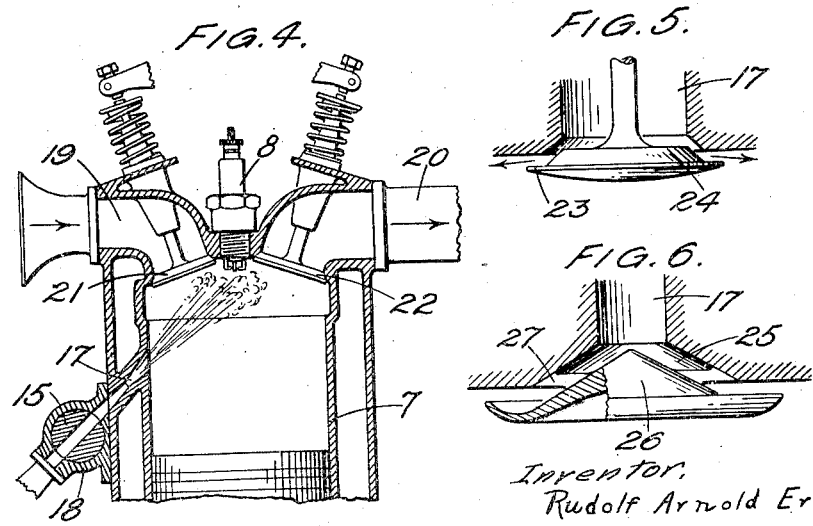
Inventor,
Rudolf Arnold Erren
By: Stevens and Davis
Attorneys Patented June 27, 1939

2,164,234

UNITED STATES PATENT OFFICE 2,164,234

METHOD OF CHARGING INTERNAL COMBUSTION ENGINES

Rudolf Arnold Erren, London, England

Application September 17, 1938, Serial No. 230,509
In Great Britain November 27, 1936

7 Claims. (Cl. 123—69)

This invention relates to internal combustion engines of the kind in which a compressed mixture of volatile hydrocarbon fuel and air is fired by means of an ignition plug, and primarily is concerned with an improved method of charging the working cylinders of such engines.

Usually, in internal combustion engines the fuel is atomised and a working mixture of air and fuel is formed in the carburettor, which mixture is introduced into the working cylinder in quantities varying with the speed of revolution of the engine, the object being to obtain as homogeneous a mixture of air and fuel as possible in the working cylinder. The speed of revolution of the engine is controlled by varying by means of a throttle valve the volume of mixture admitted to the cylinder. The result of this method of operation is that at low speeds of revolution the quantity of mixture introduced into the cylinder is small and the final compression pressure obtained in the cylinder is low, with the result that the proper burning of the mixture during the working stroke of the engine is difficult to achieve and consequently over-heating and loss of efficiency are apt to occur under such conditions.

According to my invention, I endeavour so to arrange matters that at all speeds of revolution of the engine I introduce into the cylinder a volume of atomised fuel and air, which collectively is substantially constant, so as to maintain a substantially constant final compression pressure in the cylinder at all speeds of revolution of the engine, and I control the speed of revolution of the engine by varying the amount of atomized fuel contained in the substantially constant volume of mixture introduced into the cylinder. When working by this method it is necessary for efficient operation to ensure that homogeneity of the mixture is not secured in the working cylinder but that in the region of the ignition plug a mixture is obtained of the optimum ratio of air to fuel for securing proper ignition and combustion of the said mixture, whilst in the remaining portions of the cylinder the composition of the mixture may vary within wide limits. In order to do this, I provide means to give stratification of the mixture so that a stratum of mixture of optimum composition is introduced into the region of the ignition plug, this stratum forming the working fuel in the cylinder and the remaining stratum taking substantially no part in the combustion but merely absorbing the heat of combustion and operating by way of expansion in the working cycle of the engine. By this means I minimize the loss of heat to the cylinder walls by radiation and improve the thermal efficiency of the engine, the inactive stratum of mixture in the cylinder acting substantially entirely as heat-absorbing medium wherein the absorbed heat may be converted into useful power by expansion of the gases due to combustion. In order to secure my results, I admit air unthrottled to the working cylinder during the normal suction or charging stroke and upon closure of the exhaust outlet and air inlet I inject into the cylinder a mixture of atomised fuel and air over a portion of the compression stroke, said mixture being injected by means which ensure that the amounts of atomised fuel and air injected are substantially proportional to the speed of revolution of the engine. This proportionality is necessary for efficient working because even with an unthrottled independent air intake the volume of air entering the cylinder will at high speeds be reduced below the theoretical volume determined by the volumetric sweep of the piston in the working cylinder so that in order to maintain a constant total volume of air and mixture in the cylinder at all speeds, it is necessary to compensate for the reduced intake of air as the speed increases by increasing the amount of fuel and air mixture injected.

My invention therefore consists in the method of charging a working cylinder of an internal combustion engine, which method is characterised in that during each charging stroke air is fed unthrottled to the cylinder and upon closure of the exhaust outlet and air inlet, injecting a charge of atomised fuel and air mixture into the cylinder in amount varying with the speed of revolution of the engine so as to maintain the final compression pressure substantially constant at all speeds of revolution, and so that the said charge of atomised fuel and air mixture is stratified at the cylinder head in the region of the ignition plug so as to produce in said region a stratum of atomised fuel and air mixture of optimum composition for ignition and combustion.

The point that any inlet port whether controlled by piston cut-off or by a valve must necessarily have some throttling effect upon the air admitted to the cylinder through it, is fully appreciated, but the air inlet can be designed to give the maximum efficiency required for any particular engine, and where in this description the term "unthrottled" is used, it is intended to imply that no additional control is provided for varying the amount of air being fed to the cylinder.

It has previously been proposed to introduce into the working cylinder of an internal combustion engine air and a working mixture of air and fuel separately, and to control the speed of revolution of such an engine by varying the amount of fuel so supplied, but it has not previously been recognised that in order successfully to operate such an engine, the total volume of gases supplied to the cylinder and the consequent final compression pressure should be maintained constant for all speeds of revolution; neither has it been realised that in order to obtain proper combustion and utilisation of the heat in such a cylinder, stratification of the gases so supplied must be secured so as to obtain a stratum of mixture of optimum composition in the region of the ignition plug.

In order that my invention may be clearly understood and more readily carried into effect, the invention is hereinafter described with reference to the accompanying diagrammatic drawing, wherein alternative means of securing stratification of the mixture in the cylinder and of securing the injection of the mixture of air and fuel into the working cylinder already charged with air are shown diagrammatically and by way of example.

Figure 1 is a section taken through a single-cylinder two-stroke internal combustion engine according to the invention;

Figure 2 is a timing diagram of a single-cylinder engine operating on the two-stroke cycle according to the present invention;

Figure 3 is a timing diagram relating to the charging and compression strokes of a single-cylinder engine operating according to the invention on the four-stroke principle;

Figure 4 is a fragmentary view serving to show one manner in which the air inlet, fuel and air mixture inlets, the exhaust outlet and the sparking plug may be arranged in an engine operating on the four-stroke principle;

Figure 5 indicates a form of valve which may be used to provide for fuel injection and baffling to produce a stratified layer of fuel and air mixture when injection is effected through the cylinder head; while Figure 6 shows a further modified form of inlet with a baffle for producing a stratified fuel and air mixture in the immediate vicinity of the cylinder head.

First dealing with an engine operating according to the invention on the two-stroke cycle and as described with reference to Figures 1 and 2, the cylinder 7 has the usual sparking plug 8 inserted through the head thereof, is provided with an exhaust port 9 and an air inlet port 10 through which air may pass into the crankcase while the piston 11 is going up on the compression stroke; furthermore, there is the transfer port 12 through which air compressed in the crankcase as the piston 11 descends on the firing stroke is forced into the combustion space in the cylinder 7 above the piston. All the above-described arrangements are constructionally substantially in accordance with common practice in two-stroke engines, but with the present method of charging air alone is delivered unthrottled to the cylinder during the charging stroke and when the piston has closed the exhaust and air inlets a fuel and air mixture is injected into the combustion chamber in the region of the ignition plug. The atomised fuel and air mixture is drawn or forced through a carburettor of any usual construction, indicated at 13, by the blower 14 which injects the said mixture through a rotary valve 15 into the combustion chamber. Both the rotary valve and the blower are appropriately geared and are positively driven, for example by the chain 16 indicated in broken lines, so that the volume of mixture delivered by the blower increases as the speed of the engine increases and the intake of air falls off. The injection port 17 in the cylinder wall through which the fuel and air mixture passes to the cylinder is directed towards the cylinder head in the immediate vicinity of the sparking plug 8, so that a rich fuel and air mixture is stratified thereat. The rotary valve may be of any convenient construction and is briefly indicated in the drawing as having the inner rotating part 15 enclosed within the casing 18 secured in any convenient manner to the cylinder casting.

By reference to the two-stroke timing diagram represented by Figure 2, it will be apparent that air alone is drawn unthrottled into the crankcase and fed to the cylinder 7 through the transfer port 12, and that immediately the piston has traversed enough of its upward stroke to cover the air inlet port and the exhaust port, a rich air and fuel mixture is blown into the cylinder towards the head so as to produce a stratum of rich mixture at the top of the cylinder in the immediate vicinity of the sparking plug. The period for which the exhaust port 9 is open is indicated by the arrow $e$; the period for which the transfer port 12 is open is indicated by the arrow $a$, and injection of the rich fuel and air mixture is effected during a crankshaft angular movement in the neighbourhood of about 30° as indicated by the arrow $i$. As injection of the fuel and air mixture does not start until the air inlet and exhaust ports are closed, there will be no possibility of the fuel mixture being carried over through the exhaust or back through the air inlet between the crankcase and cylinder.

It is contemplated that in some two-stroke engines crankcase scavenging may be dispensed with, in which case the exhaust from the cylinder may be effected through the simple expedient of an exhaust pipe longer than ordinarily employed and having some sort of venturi effect. In any event, if required an impeller may be provided for withdrawing the exhaust gases as well as similar means for effecting the charging of air into the cylinder.

It will be appreciated that two-stroke constructions such as hereinbefore described possess many advantages. Thus, by reason of the fact that air alone is fed to the crankcase, not only is pollution of the oil in the crankcase avoided, but also the clean cool air introduced at each cycle will provide a very effective cooling medium. It is preferred in all cases that an effective air cleaner should be provided and especially is that so for very obvious reasons where the air is fed through the crankcase. It may further be added that the rotary valve should preferably be placed in some position close to the working cylinder in order to absorb heat therefrom and provide in effect a hot spot for heating up the charge preparatory to injection. So far as the blower is concerned, it is not even necessary to provide special cooling means, since the greater part of any heat generated therein will be absorbed in carburation or atomisation of the fuel and air mixture.

Although in the foregoing description the means through which the fuel and air mixture is injected into the cylinder has been described as a rotary valve, any convenient form of injector may be provided. Similarly, instead of the usual carburettor, any convenient form of variable-delivery pump may be used for supplying the fuel and air mixture.

The power output of the engine can be controlled by varying the amount of air and fuel mixture delivered by the blower 14 to the cylinder already charged with air, and if necessary by varying the ratio or fuel to air in the mixture thus injected. Any means for controlling these variations may be employed. In some cases provision may be made for varying the output of the blower. It will be appreciated that where the power output is controlled by varying the amount of atomised fuel and air mixture injected, there may be a slight increase in the total volume of air and atomised fuel and air mixture collectively introduced into the working cylinder, but that increase will ordinarily prevail only during pick-up and being in any event small will be quickly absorbed when the engine adjusts itself to the new conditions.

For an engine operating according to the present invention on the four-stroke cycle, the arrangement is very similar except that as will be seen from the arrow $a$ in Figure 3, air is fed unthrottled during the whole of the charging stroke, and then after the air inlet valve is closed injection of the fuel and air mixture is effected over the period indicated by the arrow $i$, such injection being concluded before a high pressure has been built up in the cylinder. In most cases both with two-stroke and with four-stroke engines, it is preferable that all injection shall be finished before the piston has traversed half the compression stroke, so that there will be no need to provide specially high output blowers for effecting adequate injection, although the output of the blower is preferably such that at all times injection pressure will be at least twice that of the pressure prevailing in the cylinder at the period of injection.

The exemplary arrangement shown in Figure 4 is merely intended to convey a rough idea of how the air inlet, the fuel and air mixture inlet and the exhaust outlet may be arranged for a four-stroke engine operating on the proposed new principle. For the sake of convenience, the valve operating gear has not been shown, but it will be readily seen that the cylinder 12 having the usual sparking plug 8 in the head thereof is provided with an air inlet 19 and the exhaust pipe 20, the openings of which into the cylinder are closed by the valves 21 and 22, respectively, appropriately timed and actuated for opening and closing. The rotating part 15 is the rotary valve and the injection port 17 are arranged and the former is driven in a similar manner to that described with reference to the arrangement shown in Figure 1, while the latter is similarly so arranged as to direct the injected fuel and air mixture towards the cylinder head in the immediate vicinity of the sparking plug 8. If the port through which the injection of the fuel and air mixture is effected is provided at the side of the cylinder, it will always be directed towards the cylinder head and the sparking plug, but if on the other hand injection of the rich fuel and air mixture is effected through the cylinder head, baffling means may be necessary to produce proper stratification, and in Figure 5 there is illustrated an arrangement in which the injection opening 17 extends through the cylinder head and is controlled by a valve 23 appropriately timed for opening and closing.

The inner surface 24 of the valve head is stepped to form a baffle tending to deflect the mixture outwardly and towards the cylinder head as it is injected.

In the arrangement shown in Figure 5, the rotary valve may be dispensed with, the opening 17 being virtually a continuation of the intake manifold fed directly from the blower, but in Figure 6 there is shown a modified arrangement in which the inlet 17 extending through the cylinder head from a rotary valve or other inlet control member is provided with a flared opening 25, which in many cases will itself suffice to produce the necessary stratification of the injected fuel and air mixture, but where necessary a baffle member 26 may be provided in the flared opening in order the better to direct the injected mixture upwards and outwards towards the cylinder head. The baffle 26 may be cast integrally with the cylinder head, being attached thereto by the arms 27.

It may be mentioned that Figures 5 and 6 are shown for the sake of clearness on quite a large scale but in actual practice those parts will be small.

The fact that pure air is fed unthrottled into the cylinder during the suction stroke not only ensures high volumetric efficiency, but it also ensures very efficient cooling, which of course enables higher compression ratios to be used without doped fuel. If high efficiency is obtainable with ordinary straight fuels, it follows that special valves, valve seats, cylinder heads, et cetera, will then be unnecessary as high temperatures and excessive incrustation will not be prevalent. The fact that the atomised mixture is injected also has a marked effect on cooling, for expansion of the injected fuel mixture takes up heat not only from the combustion space but also from the cylinder walls, sparking plugs, valves, et cetera.

Although the invention has been described by way of example as applied to single-cylinder engines, it will be appreciated that it is equally applicable to multi-cylinder engines, and other means of obtaining the desired stratification and of securing injection of the air and fuel mixture into the already air-charged cylinder so as to maintain a substantially constant total volume of gas and consequently a constant final compression pressure will suggest themselves to those skilled in the art without departing from the scope of my invention.

What I claim is:

1. In a two-cycle internal combustion engine, a working cylinder having a piston operable therein, a crank case associated with said working cylinder and containing a crank shaft to be driven by said piston, an exhaust outlet and an air inlet in said cylinder and arranged so as to be controlled by the operation of said piston, said air inlet being in communication with said crank case whereby the air may be compressed and forced into said cylinder by said piston, sparking means in the head of said cylinder, means for injecting a fuel mixture into said cylinder through a side wall thereof and directing said mixture into the vicinity of said sparking means whereby to form stratified layers of fuel and air within said cylinder with the richest layers adjacent said sparking means, a rotary valve for controlling the injection of said fuel mixture, a rotary pump for forcing said fuel mixture into said cylinder, and driving means connected to said crank shaft for operating said valve and said pump.

2. In a two cycle internal combustion engine, a working cylinder having a piston operable therein, a crank case associated with said working cylinder and containing a crank shaft to be driven by said piston, an exhaust outlet in said cylinder and arranged so as to be controlled by the operation of said piston, an air inlet in said cylinder for supplying air to said crank case and controlled by said piston, said inlet being arranged so that after the inlet is closed the admitted air may be compressed within said crank case by said piston, an air inlet in said cylinder controlled by said piston and in communication with said crank case whereby the compressed air may be forced into said cylinder by said piston during a portion of the exhaust cycle, sparking means in the head of said cylinder, means for injecting a fuel mixture into said cylinder through a side wall thereof and directing said mixture into the vicinity of said sparking means whereby to form stratified layers of fuel and air within said cylinder with the richest layers adjacent said sparking means, a rotary valve for controlling the injection of said fuel mixture, a rotary pump for forcing said fuel mixture into said cylinder, and driving means connected to said crank shaft for operating said valve and said pump.

3. In an internal combustion engine, a working cylinder having a piston operable therein, an exhaust outlet and an air inlet in said cylinder, means for controlling the operation of said outlet and inlet, sparking means in the head of said cylinder, means for injecting a fuel mixture down through the cylinder head, baffle means integral with said cylinder head and positioned in front of the injection means for directing said mixture into the vicinity of said sparking means whereby to form stratified layers of fuel and air within said cylinder with the richest layers adjacent said sparking means, and a valve for controlling the injection of said fuel mixture.

4. In an internal combustion engine, a working cylinder having a piston operable therein, a crank case associated with said working cylinder and containing a crank shaft to be driven by said piston, an exhaust outlet and an air inlet in said cylinder and arranged so as to be controlled by the operation of said piston, said air inlet being in communication with said crank case whereby the air may be compressed and forced into said cylinder by said piston, sparking means in the head of said cylinder, means for injecting a fuel mixture through the cylinder head, and a reciprocating valve associated with said injection means for controlling the injection of said fuel mixture, said valve having a baffle surface thereon for directing said mixture into the vicinity of said sparking means whereby to form stratified layers of fuel and air within said cylinder with the richest layers adjacent said sparking means, a rotary valve for controlling the injection of said fuel mixture, a rotary pump for forcing said fuel mixture into said cylinder, and driving means connected to said crank shaft for operating said valve and said pump.

5. In an internal combustion engine, a working cylinder having a piston operable therein, a crank shaft to be driven by said piston, an exhaust outlet and an air inlet in said cylinder, means for controlling said outlet and inlet, sparking means in said cylinder, means for injecting a fuel mixture into said cylinder and directing said mixture into the vicinity of said sparking means whereby to form stratified layers of fuel and air within said cylinder with the richest layers adjacent said sparking means, said controlling means and said injection means being arranged so that said outlet and inlet are closed prior to the operation of said fuel injection means, said injection means being adapted to inject the fuel mixture into the cylinder over a period which begins after the normal intake stroke when the air intake and exhaust valves are closed and terminates before the working piston has traversd substantially half its compression stroke, a valve for controlling the injection of said fuel mixture, a pump for forcing said fuel mixture into said cylinder, and means connected to said crank shaft for operating said valve and said pump.

6. In an internal combustion engine, a working cylinder having a piston operable therein, a crank shaft to be driven by said piston, an exhaust outlet and an air inlet in said cylinder, means for controlling said outlet and inlet, sparking means in said cylinder, means for injecting a fuel mixture into said cylinder and directing said mixture into the vicinity of said sparking means whereby to form stratified layers of fuel and air within said cylinder with the richest layers adjacent said sparking means, said controlling means and said injection means being arranged so that said outlet and inlet are closed prior to the operation of said fuel injection means, said injection means being adapted to inject the fuel mixture into the cylinder during a crank shaft angular movement of more than 30° and terminating before the working piston has traversed substantially half of its compression stroke, a valve for controlling the injection of said fuel mixture, a pump for forcing said fuel mixture into said cylinder, and means connected to said crank shaft for operating said valve and said pump.

7. The method of charging a cylinder in an internal combustion engine to form stratified layers within the cylinder which comprises injecting air into said cylinder prior to and during the start of the compression stroke, injecting a fuel mixture into said cylinder and adjacent the sparking means in timed relation with respect to the compression stroke, said injection taking place after the termination of the air injection and before the piston has traversed substantially half of its compression stroke, so that the fuel mixture and air substantially maintain their separate identities, whereby they will form stratified layers upon compression.

RUDOLF ARNOLD ERREN.

CERTIFICATE OF CORRECTION.

Patent No. 2,164,234. June 27, 1939.

RUDOLF ARNOLD ERREN.

It is hereby certified that error appears in the printed specification of the above numbered patent requiring correction as follows: Page 3, first column, line 9, for the word "or" read of; line 56, for "is" read of; and that the said Letters Patent should be read with this correction therein that the same may conform to the record of the case in the Patent Office.

Signed and sealed this 29th day of August, A. D. 1939.

(Seal)

Leslie Frazer,
Acting Commissioner of Patents.